(No Model.) 3 Sheets—Sheet 1.
W. E. MOORE.
AUTOMATIC REGULATOR FOR CONVERTERS OF ENERGY.
No. 549,383. Patented Nov. 5, 1895.
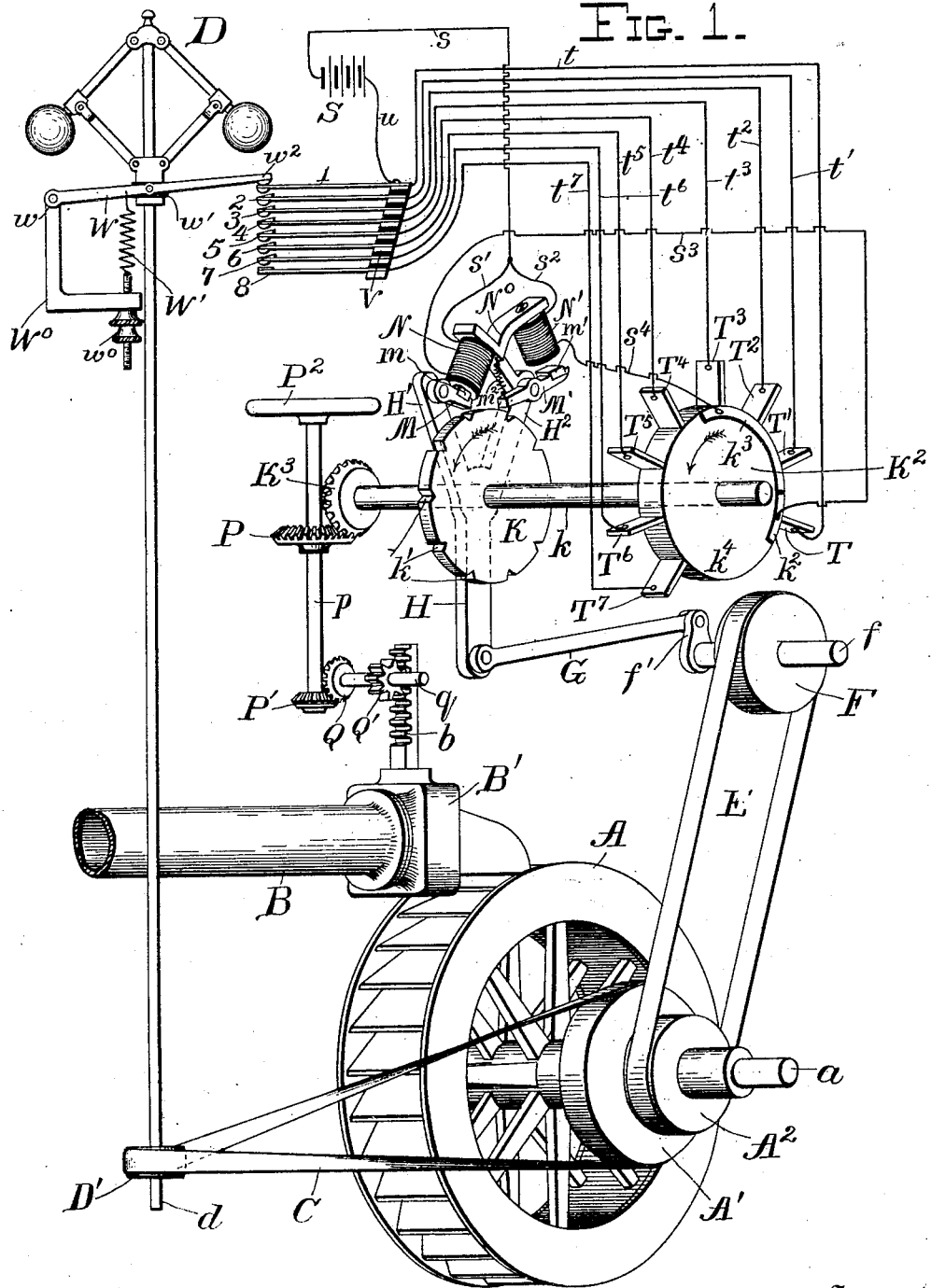

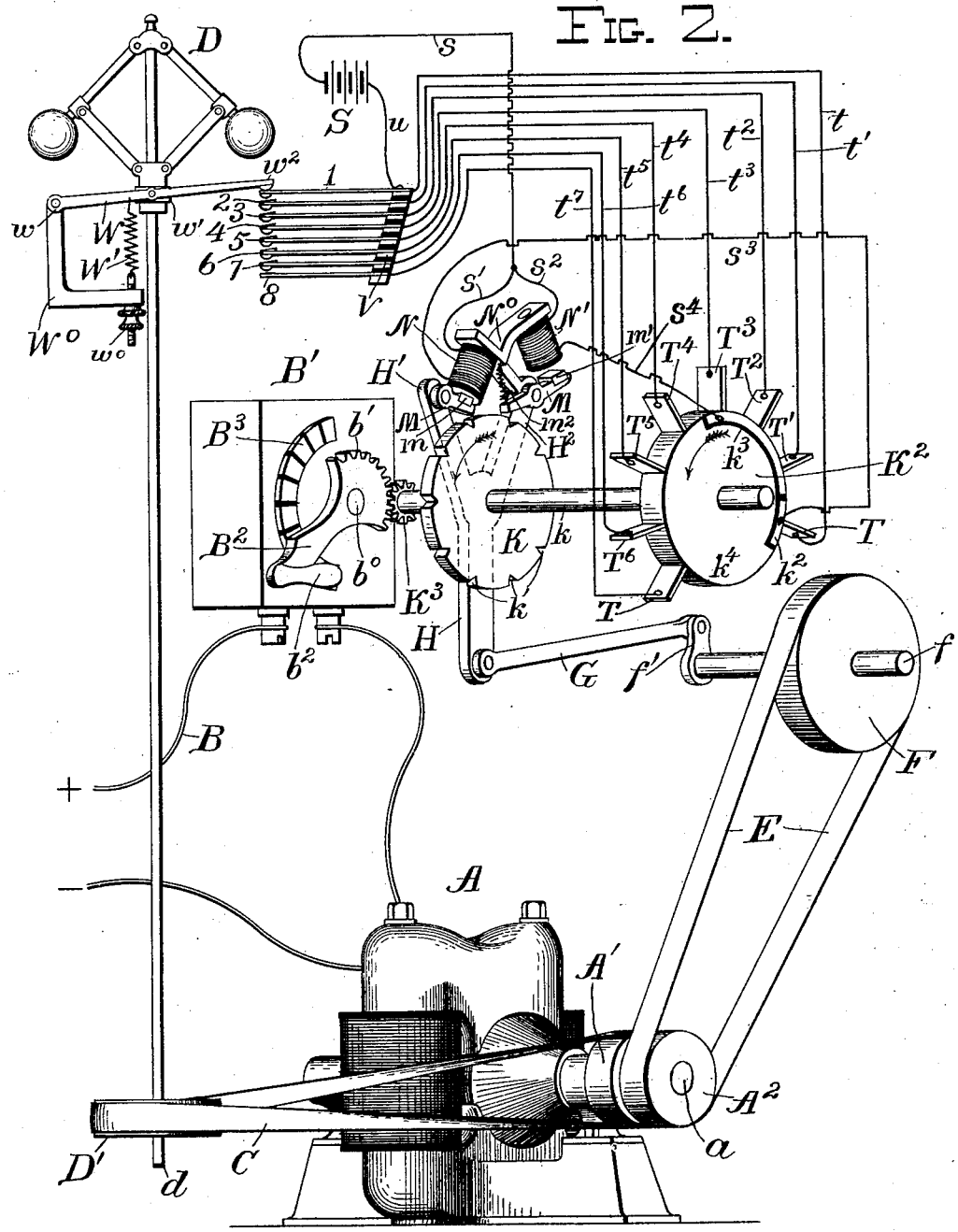

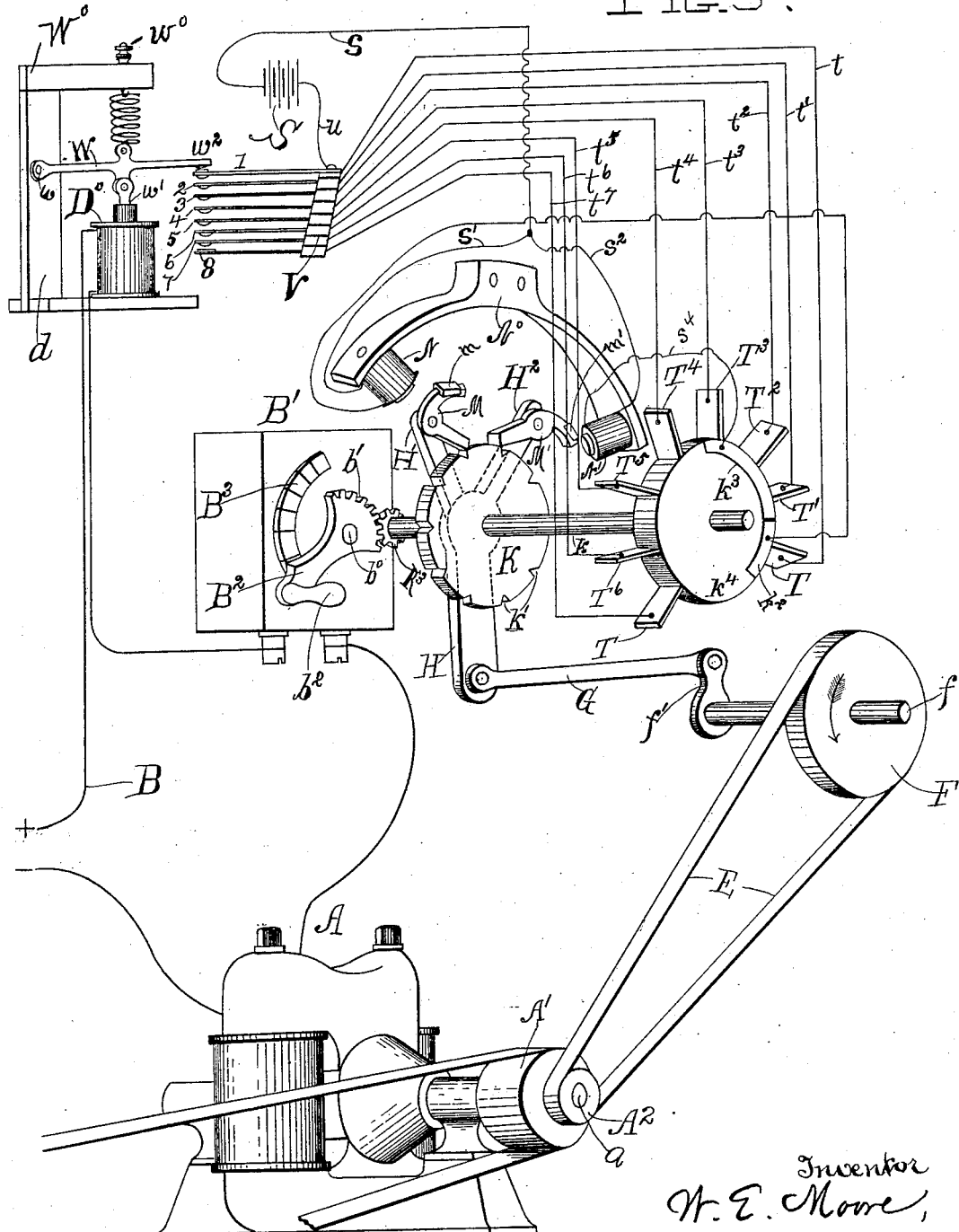

UNITED STATES PATENT OFFICE.

WILLIAM E. MOORE, OF AUGUSTA, GEORGIA.

AUTOMATIC REGULATOR FOR CONVERTERS OF ENERGY.

SPECIFICATION forming part of Letters Patent No. 549,383, dated November 5, 1895.

Application filed March 20, 1895. Serial No. 542,734. (No model.)

*To all whom it may concern:*

Be it known that I, WILLIAM E. MOORE, a citizen of the United States, residing at Augusta, in the county of Richmond and State of Georgia, have invented certain new and useful Improvements in Automatic Regulators for Converters of Energy; and I do hereby declare the following to be a full, clear, and exact description of the invention, such as will enable others skilled in the art to which it appertains to make and use the same.

My invention relates to a new method of automatically adjusting the motive power supplied to any given motor to the variations in load or in speed of the motor; and the objects of my invention are to provide a speed or load indicator with a suitable number of circuit opening and closing devices so arranged as to be thrown in multiple successively when the load is increasing and to be disconnected in the same manner when the load is decreasing; and to provide automatic operative mechanism, so arranged and connected to the indicator that the motive power shall be changed in proportion to and preferably in synchronism with the variations of speed or load, as shown by the indicator in a step-by-step manner. The indicator may be connected mechanically, electrically, or by means of fluid-pressure to the automatic operating mechanism, which I will hereinafter designate by the term "controller;" but I prefer to operate the device by electricity, as will be hereinafter described.

Reference is had to the accompanying drawings, in which the same parts are indicated by the same letters and numerals throughout the several views.

Figure 1 is a diagrammatic view of the apparatus as used for regulating the speed of a water-wheel. Fig. 2 is a similar view of the apparatus as applied to regulating the speed of an electric motor, and Fig. 3 is a similar view of the apparatus as applied to regulating the current from a dynamo.

A represents the prime motor, which in Fig. 1 is represented by an overshot water-wheel, and in Fig. 2 is represented by an electric motor; but these two motors are intended merely as types of motor to which the hereinafter-described apparatus is applicable, the same being adapted to use in controlling the speed of motors of almost any description and is also capable of being adapted to regulating the voltage or the quantity of current transmitted from a dynamo, as shown in Fig. 3.

The driving-shaft of the prime motor represented by $a$ carries the driving-pulley $A'$, over which passes the belt C for driving the speed-indicator, which is represented by D as a centrifugal governor of ordinary construction mounted upon the spindle $d$ and driven by the pulley $D'$. Any other desired form of speed-indicator may be adopted, but this is shown as typical. The driving-shaft $a$ also carries a pulley $A^2$, over which passes the belt E, connected to the pulley F on the shaft $f$, which carries a crank $f'$, connected by means of the rod G to the oscillating lever H, which is pivoted on the shaft $k$, and terminates in two arms $H'$ and $H^2$, which will hereinafter be more fully described. It is not essential that this shaft $f$ be rotated by the motor to be regulated, but it may be connected to any other source of power. The shaft $k$ carries the toothed wheel K, provided with indentations $k'$, adapted to engage the pawls M and $M'$ pivoted to the arms $H'$ and $H^2$. These pawls are provided with armatures $m$ and $m'$, respectively, adapted to be drawn to the electro-magnets N and $N'$, which are secured to the support $N^0$, fast to the arm $H^2$; or the magnets N and $N'$ may be so attached to a stationary support $N^2$ that pawls M and $M'$ shall come under their influence when rocked to extreme end of stroke, as shown in Fig. 3. The pawl $M'$ is ordinarily held out of engagement with the toothed wheel K by means of the spring $n^2$, while the pawl M is free to fall on the said toothed wheel except when drawn to the magnet N. When the magnet $N'$ is excited, the pawl $M'$ is caused to engage in the toothed wheel K. As long as both pawls are out of engagement with the wheel K the bifurcated lever H continues to rock without moving the wheel K and the shaft $k$; but when one pawl is in operation the rocking of the lever H causes the wheel K and the shaft $k$ to be turned backward or forward, one tooth at a time, as will be hereinafter more fully described.

Connected to and moving simultaneously with the shaft $k$ is a disk $K^2$, provided on its outer edge with a continuous conducting-strip $k^3$ and with a shorter conducting-strip $k^2$, insulated from the strip $k^3$. On these strips the various brushes T T' T⁷ bear, forming electrical connections, which will be hereinafter more fully described.

The shaft $k$ carries a gear-wheel $K^3$, connected directly to the mechanism for controlling the motive power, and this shaft, with its various attachments, I call the "controller." In the device shown in Fig. 1 this gear-wheel $K^3$ meshes with another gear P, mounted on the shaft $p$, which shaft carries at its upper end a hand-wheel $P^2$ for operation by hand when desired, and at its lower end a gear-wheel P', meshing in a similar gear Q, which is mounted on the shaft $q$, which shaft carries the pinion Q', meshing in the rack $b$, operating the valve situated in the box B' for controlling the flow of water through the main pipe B. In the form of device shown in Figs. 2 and 3 the pinion $K^3$ meshes in the cogged arc $b'$, which is attached to the hand-lever $B^2$, provided with a handle $b^2$ and pivoted at $b^0$ on the switchboard B'.

$B^3$ represents a series of resistance-coils, which being of ordinary construction will not be further described.

The electric current comes from the leading-in wire $B^0$ and passes through one or more of the resistance-coils $B^3$, according to the position of the hand-lever or switch $B^2$.

The regulation of the flow of electricity to the motor or dynamo A or the flow of water to the wheel A (shown, respectively, in the various figures) is effected in precisely the same way by the rotation of the shaft $k$, and as these three types of motive power are merely selected to show the wide range of applicability of my invention, I will now proceed to describe the method of an apparatus for rotating the said shaft $k$, which constitutes the more essential features of my invention.

S represents any source of electrical energy, one pole of which is connected to the wire $s$, which wire is connected by means of the wires $s'$ and $s^2$ to the magnets N and N', respectively. The current passes from the magnet N through the wire $s^3$ to the conducting strip or segment $k^2$, whence it returns either through the brush T and the wire $t$ to the wire $u$, as shown in Figs. 1 and 2, and to the opposite pole of the source of electric energy, or it passes through one of the other brushes T' T², &c., and the corresponding wire, as will be hereinafter more fully described. The wire $s^2$ carries the current through the magnet N' and thence by means of the wire $s^4$ to the segment $k^3$. The segment $k^2$ is made of less length than the distance between any two of the adjacent brushes T T' to T⁷. These brushes are connected by means of the wires $t$ $t'$ $t^2$ to $t^7$ to the strips 1 2 3 to 8, which are insulated from each other and are adapted to be pressed down into electrical contact from the top downward by means of the arm W, which is pivoted at $w$ and is connected by means of the loose collar $w'$ to the centrifugal governor or speed-indicator D. These strips are provided with carbon contact tips to prevent oxidation of contact due to sparking. This lever W is preferably pivoted to a frame $W^0$, and is adjusted to any desired standard of speed by means of the spring W' and the screw $w^0$. The free end $w^2$ of this arm W is adapted to press the contact-tip of the upper resilient conducting-strip 1 on the next lower strip 2, and the contact of this strip on the next lower strip 3, and so on, as the centrifugal governor falls, due to the slowing down in speed of the prime motor; and when this speed exceeds the maximum amount required the arm W is lifted, so as to clear the upper strip 1 from the strip 2, which should correspond to the point of maximum automatic cut-off of the motive power. When the arm W has compressed the contacts 1 2 3 to 8 into connection, the conducting-segment $k^2$ will be moved under the brush T⁷, corresponding to the point of maximum opening of cut-off or the minimum cut-off. This motion of the centrifugal governor or speed-indicator causes the apparatus to operate automatically, as we will now describe.

It will be seen that if the disk $K^2$, which we will call the "selector," be in the position shown in Figs. 1 and 2, the current will flow from the source of electric energy S through the wires $s$ and $s'$ and the magnet N and passing through the wire $s^3$, the strip $k^2$, the brush T, the wire $t$, and the wire $u$ will return to the opposite pole of the source of electricity S. At the same time the magnet N will be excited, attracting the armature $m$ and thus holding the pawl M out of engagement with the toothed wheel K. The magnet N' will not be excited, however, since no current will flow through it, and hence the spring $m^2$ will raise the pawl M' clear of the toothed wheel K. Thus the two pawls M and M' will be clear of the wheel K, and the lever H will oscillate on the shaft $k$ without disturbing the cut-off of the motive power.

Now suppose from fall of pressure or from increase of load the motor begins to run slower. The fly-balls of the governor will drop somewhat, causing the arm W to press together the contact-strips 1 and 2, completing the electric circuit through the wire $t'$, the brush T', the strip $k^3$, the wire $s^4$, the magnet N', and the wires $s^2$ and $s$, thus exciting the magnet N', which will attract the armature $m'$ and cause the pawl M to engage the wheel K, and the said pawl will push the wheel around in the direction of the arrow, thus opening the valve or switch lever or other device for controlling the amount of motive power supplied to the motor. At the same time the shaft $k$ will be turned around until the brush T rests on the insulating part $k^4$ of the selector $K^2$, while the brush T' will rest on the strip $k^2$, and thus the magnet N will remain excited and still support the pawl M out of engagement with the wheel K, while the magnet N' will be cut out of circuit, allowing the spring $m^2$ to withdraw the pawl M', and thus for the time being neither pawl will be in operation and the regulating device will be inert. Now if the motor still continues to slow down the contact-strips 1 and 2, already in contact, will be pressed down into electrical connection with the strip 3, and the magnet N' will be excited as before, while the subsequent motion of the selector $K^2$ will throw the magnet N' out of circuit as before, and thus a second step in the opening of the valve or of the switch will be effected. In the same way the device will operate for any further diminution of speed of the motor. Now suppose the speed of the motor to increase when, say, the contact-strips 1, 2, and 3 are in electrical connection, pressed together by the arm W. The increase of speed will throw the fly-balls outward, lifting the arm W and allowing the resilient strips 1 and 2 to spring away from the strip 3. The brushes T and T' will be at that instant on the non-conducting surface $k^4$, while the circuit through the brush $T^2$ will be broken. The magnet N will therefore be demagnetized, allowing the pawl M to drop on and engage the wheel K, and so turn the said wheel and with it the selector $K^2$ in the opposite direction, thus admitting more power to the apparatus. The backward motion of the wheel K will turn the selector $K^2$ backward under the brushes, and as each new brush passes onto the segment $k^2$ the operation of the pawl M will be intermitted. Thus it will be seen that as the speed or load either increases or decreases, the controller will operate in successive steps, and thus the "racing" or "hunting" in the cut-off, so common in automatic regulating devices, will be avoided.

The ordinary hand apparatus—such, for instance, as the hand-wheel $P^2$ or the switch $B^2$—is provided for starting or stopping the motor or for regulating the speed thereof by hand. Thus it will be seen that for a certain specified decrease in speed, as shown by the indicator, the device will open the cut-off a certain specified amount and discontinue the opening motion until a further specified decrease of speed takes place, when the manipulator would again open the cut-off an amount corresponding to the decrease of speed which had last taken place, so that the speed must have fallen a given percentage to open the cut-off a corresponding percentage. It is not essential that the cut-off opening should be exactly proportional to the decrease in speed. In fact, for some purposes it is desirable to have the device open the cut-off in an irregular ratio to the change, as shown by the indicator; nor is it necessary that the device should move the cut-off in exact synchronism with the indications of the indicator, though it is desirable for it to follow the same closely.

In Fig. 3 the cut-off or regulator is represented as a series of resistance-coils on the rheostat B', but may be any other one of the methods of regulating current or voltage, such as shifting position of brushes on commutator-bars, varying the intensity of the magnetic field, or by varying the speed of dynamo. In this case the fly-ball indicator D is replaced by a current-indicating solenoid $D^0$, with its core attached to the lever W, as at $w^8$, and the tension is adjusted by the spring W' and screw $w^9$. The operation of the device illustrated in Fig. 3 will be obvious from the description of those shown in Figs. 1 and 2.

It will be obvious that the herein-described apparatus, with slight changes that would readily suggest themselves to any skilled mechanic, might be applied to a great variety of motors for regulating the speed thereof; and it is especially suitable for those classes of steam-engines wherein the valve motion is heavy or sluggish. Moreover, the same may be used to regulate the quantity or voltage of current from a dynamo, when the fly-ball indicator D is replaced by a current or voltage indicator. These and various other modifications would readily suggest themselves to any one skilled in the art, which could be used without departing from the spirit of my invention.

Having thus described my invention, what I claim, and desire to secure by Letters Patent of the United States, is—

1. In a speed regulating device, the combination with a motor and an adjustable power cut off connected thereto, of a speed indicator operated by said motor, a source of electricity, a plurality of electric circuits controlled by said speed indicator, and mechanism operated by said electric circuits for moving said cut off in either direction, to a point proportional to the number of said circuits energized by said speed indicator, substantially as described.

2. In a speed regulating device, the combination with a motor and an adjustable power cut off connected thereto, of a speed indicator operated by said motor, a source of electricity, a plurality of electric circuits controlled by said speed indicator, and mechanism operated by said electric circuits for moving said cut off in either direction intermittently and in a step by step manner, so that each step in speed or load gaged by said speed indicator shall correspond to a similar step in movement of cut-off, substantially as described.

3. In a speed regulating device, the combination with a motor and an adjustable power cut off connected thereto, of a speed indicator operated by said motor, a source of electricity, a plurality of electric circuits controlled by said speed indicator, a toothed wheel and mechanism connected thereto for moving said cut off in either direction, an electrically operated pawl adapted to move said wheel in one direction when the speed of the motor increases, and a second electrically operated pawl adapted to move said wheel in the opposite direction when the speed of the motor decreases, the said pawls being so controlled by the said circuits, as to engage and move said cut-off to a point gaged by the number of said circuits energized, substantially as described.

4. In a speed regulating device, the combination with a motor and an adjustable power cut off connected thereto, of a speed indicator operated by said motor, a source of electricity, and a plurality of electric circuits connected thereto controlled by said speed indicator, electro-magnets connected to said circuits, a combined armature and pawl adapted to be operated by each of said magnets, and mechanism operated by said pawls for moving said cut off in either direction to a point proportional to the number of said circuits energized, substantially as described.

5. In a speed regulating device, the combination with a motor and an adjustable power cut off connected thereto, of a speed indicator operated by said motor, a source of electricity, and a plurality of electric circuits connected thereto and controlled by said speed indicator, electro-magnets connected to said circuits, a combined armature and pawl adapted to be operated by each of said magnets, and mechanism operated by said electric circuits for moving said cut off in either direction intermittently and in a step by step manner to a point proportional to the number of said circuits energized, substantially as described.

6. In a speed regulating device, the combination with a motor and an adjustable power cut off connected thereto, of a speed indicator operated by said motor, a source of electricity, and a plurality of electric circuits connected thereto controlled by said speed indicator, a vibrating lever operated by any suitable source of power, electro-magnets connected to said circuits carried by said lever, and combined armatures and pawls also carried by said lever and adapted to be operated by said magnets, and mechanism operated by said pawls for moving said cut off in either direction to a point proportional to the number of said circuits energized, substantially as described.

7. In a speed regulating device, the combination with a motor and an adjustable power cut off connected thereto, of a speed indicator operated by said motor, a source of electricity, and a plurality of electric circuits connected thereto, controlled by said speed indicator, a vibrating lever operated by any suitable source of power, electro-magnets connected to said circuits, and carried by said lever, combined armatures and pawls also carried by said lever and adapted to be operated by each of said magnets, and mechanism operated by said electric circuits for moving said cut off in either direction intermittently and in a step by step manner to a point proportional to the number of said circuits energized, substantially as described.

8. In a speed regulating device, the combination with a motor and an adjustable power cut off connected thereto, of a speed indicator operated by said motor, a source of electricity, a plurality of electric circuits controlled by said speed indicator, a toothed wheel and mechanism connected thereto for moving said cut off in either direction, a vibrating lever, an electrically operated pawl mounted on said lever, and adapted to move said wheel in one direction when the speed of the motor increases, and a second electrically operated pawl also mounted on said lever and adapted to move said wheel in the opposite direction when the speed of the motor decreases to a point always proportional to the number of said circuits energized, the said pawls being operated by the said circuits, substantially as described.

9. In a speed regulating device, the combination with a motor and an adjustable power cut off connected thereto, of a centrifugal governor operated by said motor, an arm adapted to be moved by said governor, a series of contact strips insulated from each other and adapted to be brought into electrical connection *seriatim* and in multiple by the motion of said arm, a source of electricity, a plurality of electric circuits connected to said contact strips, a toothed wheel and mechanism connected thereto for moving said cut off in either direction, a pawl operated by said electric circuits and adapted to move said wheel in the opposite direction when the speed of the motor decreases to a point proportional to the number of said circuits disconnected, substantially as described.

10. In a speed regulating device, the combination with a motor and an adjustable power cut off connected thereto, of a centrifugal governor operated by said motor, an arm adapted to be moved by said governor, a series of contact strips insulated from each other and adapted to be brought into electrical connection *seriatim* and in multiple by the motion of said arm, a source of electricity, and a plurality of electric circuits connected to said contact strips, electro-magnets connected to said circuits, a combined armature and pawl adapted to be operated by each of said magnets, and mechanism operated by said pawls for moving said cut off in either direction to a point proportional to the number of said circuits energized but no farther until other of said circuits shall have been energized or disconnected, substantially as described.

11. In a speed regulating device, the combination with a motor and an adjustable power cut off connected thereto, of a centrifugal governor operated by said motor, an arm adapted to be moved by said governor, a series of contact strips insulated from each other and adapted to be brought into electrical connection *seriatim* and in multiple by the motion of said arm, a source of electricity, and a plurality of electric circuits connected to said contact strips, electro-magnets connected to said circuits, a combined armature and pawl adapted to be operated by each of said magnets, means for vibrating said pawls at a speed proportional to that of the motor, and mechanism operated by said electric circuits for moving said cut off in either direction intermittently and in a step by step manner to a point proportional to the number of said circuits energized, substantially as described.

12. In a speed regulating device, the combination with a motor and an adjustable power cut off connected thereto, of a speed indicator operated by said motor, a source of electricity, and a plurality of electric circuits connected thereto controlled by said speed indicator, a vibrating lever, electro-magnets connected to said circuits carried by said lever, and combined armatures and pawls also carried by said lever and adapted to be operated by said magnets, a shaft, a toothed wheel on said shaft adapted to be engaged by said pawls, mechanism operated by said shaft for moving said cut off in either direction, and a selector consisting of a disk of insulating material secured on said shaft and provided with two conducting segments insulated from each other forming part of the periphery of said disk, and brushes forming part of said electric circuits making contact with said strip, substantially as described.

13. In a speed regulating device, the combination with a motor and an adjustable power cut off connected thereto, of a centrifugal governor operated by said motor, a source of electricity, and a plurality of electric circuits connected thereto controlled by said centrifugal governor, a vibrating lever, electro-magnets connected to said circuits, and carried by said lever, combined armatures and pawls also carried by said lever and adapted to be operated by said magnets, a shaft, a toothed wheel on said shaft and adapted to be engaged by said pawls, mechanism operated by said shaft for moving said cut off in either direction, and a selector consisting of a disk of insulating material secured on said shaft and provided with two conducting segments insulated from each other forming part of the periphery of said disk, and brushes forming part of said electric circuits making contact with said disk, substantially as described.

14. In an apparatus of the character described, the combination with a motor and an adjustable power cut off therefor, of a shaft and mechanism driven thereby for regulating the power cut off, a vibrating lever, electromagnets and combined armatures and pawls mounted on said lever, a toothed wheel mounted on said shaft and adapted to engage in said pawls, a disk mounted on said shaft and having its surface divided into two conducting segments insulated from each other and a non-conducting segment, a source of electricity, connections from said source of electricity through each of said magnets to the conducting segments, respectively, brushes adapted to bear on the surface of said disk, electric conductors connected to said brushes, a speed indicator operated by the motor, and means operated by the speed indicator for completing the circuit through said brushes and magnets, substantially as described.

15. In a speed regulating device, the combination with a motor and an adjustable power cut off connected thereto, of a speed indicator operated by said motor, a source of electricity, a plurality of electric circuits so connected to the indicator as to be energized *seriatim* and in multiple with the variations of speed as registered by said indicator, and automatic operating mechanism driven from a source of power, geared to said cut off, capable of being thrown into intermittent operation in one direction by and simultaneously with the successive energizing of said electric circuits, and vice versa, substantially as described.

16. In an automatic regulator, the combination with a converter of energy, of an adjustable cut off connected thereto, an indicating device responsive to the changes in the transmission of energy, a source of electricity, a plurality of electric circuits, so connected to the indicator as to be energized, *seriatim* and in multiple with the variations in the transmission of energy as registered by said indicator, and automatic operating mechanism driven by any source of power connected to said cut off, capable of being thrown into operation intermittently in one direction by and simultaneously with the successive energizing of said circuits, or vice versa, substantially as described.

17. In an automatic regulator for a converter of energy, the combination with said converter and an adjustable cut off or regulator connected thereto; of an indicator; automatic operating mechanism driven by any source of power, connected to and moving with it said cut off, and capable of being thrown into operation in either direction by said indicator through its connecting appliances; of reacting mechanism operated by said cut off or any of its driving mechanism, moving in synchronism with said cut-off reacting on said automatic operating mechanism so as to cease its movement of cut off in either direction when said cut off has been moved to a point proportional to the change of speed or load as gaged by said indicator, substantially as described.

In testimony whereof I affix my signature in presence of two witnesses.

WILLIAM E. MOORE.

Witnesses:
JOS. H. BLACKWOOD,
ALBERT B. BLACKWOOD.